United States Patent
Lee et al.

(10) Patent No.: US 9,045,360 B2
(45) Date of Patent: Jun. 2, 2015

(54) METHOD AND APPARATUS FOR ENHANCED PHOTOCATALYTIC OXIDATIVE DECOLORIZATION OF WASTEWATER CONTAINING REACTIVE ANTHRAQUINONE DYE

(75) Inventors: Young Haeng Lee, Seoul (KR); Seok Heon Lee, Seoul (KR); Taek June Lee, Seoul (KR)

(73) Assignee: KOREA INSTITUTE OF SCIENCE AND TECHNOLOGY (KR)

( * ) Notice: Subject to any disclaimer, the term of this patent is extended or adjusted under 35 U.S.C. 154(b) by 1142 days.

(21) Appl. No.: 13/029,707

(22) Filed: Feb. 17, 2011

(65) Prior Publication Data

US 2012/0118833 A1    May 17, 2012

(30) Foreign Application Priority Data

Nov. 12, 2010   (KR) .................. 10-2010-0112674

(51) Int. Cl.
*C02F 1/72*   (2006.01)
*B01J 19/12*   (2006.01)
*C02F 1/32*   (2006.01)
*C02F 103/14*   (2006.01)

(52) U.S. Cl.
CPC . *C02F 1/725* (2013.01); *C02F 1/32* (2013.01); *C02F 2103/14* (2013.01); *C02F 2209/05* (2013.01); *C02F 2209/06* (2013.01)

(58) Field of Classification Search
CPC ................ C02F 9/08; C02F 1/30; C02F 1/66; C02F 1/74; B01J 23/745
USPC .......... 210/748.01, 748.14, 748.11, 660, 691, 210/284, 263, 205, 153; 422/20, 22, 24, 422/186, 186.3
See application file for complete search history.

(56) References Cited

U.S. PATENT DOCUMENTS

2005/0115004 A1   6/2005  Tashiro et al.
2011/0163046 A1*  7/2011  Neal et al. ................ 210/748.11

FOREIGN PATENT DOCUMENTS

| CN | 101318749 A | * 12/2008 |
| KR | 10-2001-0008364 | 2/2001 |
| KR | 2001-205100 | 7/2001 |
| KR | 10-2001-0091796 | 10/2001 |
| KR | 10-2003-0077865 | 10/2003 |
| KR | 10-2004-0084586 | 10/2004 |

OTHER PUBLICATIONS

Youngmi Kim et al. "Photocatalytic Decolorization of Spent Reactive Dyebath" The Summary of Papers of Autumn Conference 2009, Korean Society of Water and Wastewater and Korea Society on Water Environment, Nov. 18, 2009 with English Translation.

* cited by examiner

*Primary Examiner* — Walter D Griffin
*Assistant Examiner* — Cameron J Allen
(74) *Attorney, Agent, or Firm* — Cantor Colburn LLP

(57) ABSTRACT

Disclosed are a method and apparatus for decolorization of reactive anthraquinone dye-containing wastewater using photocatalytic oxidation, which include inducing high-efficiency photocatalytic oxidation under a controlled salt concentration and pH of wastewater to perform effective decolorization of reactive anthraquinone dye-containing wastewater. The method for decolorization of reactive anthraquinone dye-containing wastewater using photocatalytic oxidation, includes: introducing a photocatalyst and salt into reactive anthraquinone dye-containing wastewater and adjusting pH of the wastewater to a level higher than neutral pH; and irradiating UV to the photocatalyst to carry out cleavage of the reactive anthraquinone dyes through photocatalytic oxidation, thereby accomplishing decolorization of wastewater.

6 Claims, 1 Drawing Sheet

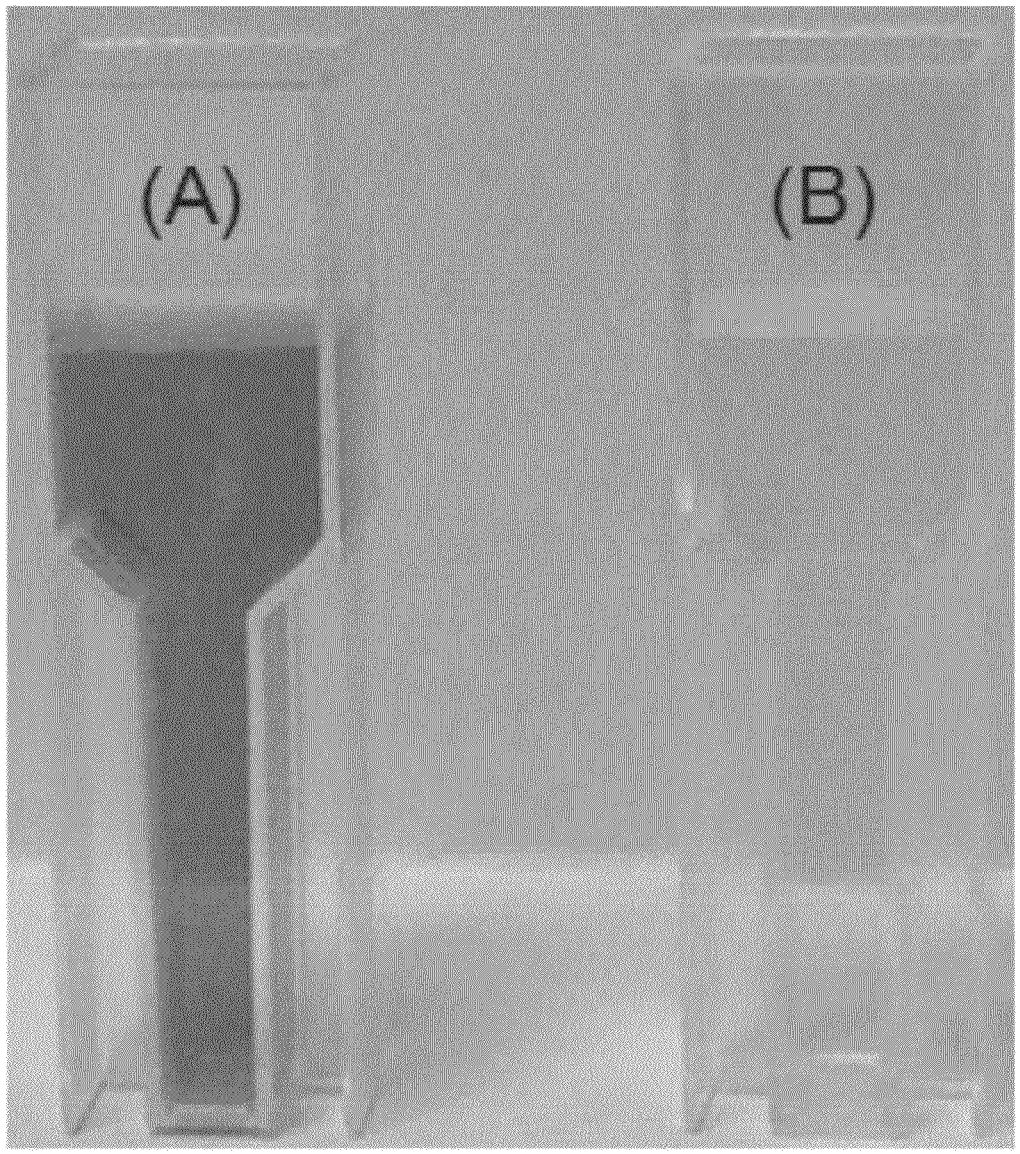

METHOD AND APPARATUS FOR ENHANCED PHOTOCATALYTIC OXIDATIVE DECOLORIZATION OF WASTEWATER CONTAINING REACTIVE ANTHRAQUINONE DYE

CROSS-REFERENCE TO RELATED APPLICATION

This application claims priority to Korean Patent Application No. 10-2010-112674, filed on Nov. 12, 2010, and all the benefits accruing therefrom under 35 U.S.C. §119, the contents of which in its entirety are herein incorporated by reference.

BACKGROUND

1. Field

The present disclosure relates to a method and apparatus for decolorization of reactive anthraquinone dye-containing wastewater using photocatalytic oxidation. More particularly, the present disclosure relates to a method and apparatus for decolorization of reactive anthraquinone dye-containing wastewater using photocatalytic oxidation, which include inducing high-efficiency photocatalytic oxidation under a controlled salt concentration and pH of wastewater to perform effective decolorization of reactive anthraquinone dye-containing wastewater.

2. Description of the Related Art

Fiber dyeing industry is so-called highly industrial water-consuming industry requiring industrial water for substantially all of the processing operations, and thus is characterized by discharge of a large amount of water contaminants. Particularly, wastewater from fiber dyeing industry has a dark color due to the remaining dye discharged from a dyeing process, and thus incurs the enmity of the people in terms of aesthetics. Moreover, it is reported in the field of water science that such wastewater interrupts the sunlight, thereby adversely affecting the growth of aquatic plants. Therefore, there is a need for developing eco-friendly highly efficient technology of decolorizing wastewater discharged from a dyeing process.

Reactive dyes have been used most frequently all over the word, due to the production of high-quality fibers and various demands, and thus are in a rapid increase in use. In addition, since reactive dyes have diverse and clear colors and are handled with ease, they are one of the dyes used widely in recent textile industries. Among such reactive dyes, reactive anthraquinone dyes come close to azo dyes in use and are increasingly in demand.

It is known that reactive anthraquinone dyes are materials having a relatively high molecular weight (500-1000 g/mol), and have high solubility so that they are hardly removed by adsorption. It is also known that reactive anthraquinone dyes are hardly degradable materials so that they are not amenable to decolorization using a typical sewage treatment process (e.g. active sludge process). In the case of wastewater containing such reactive dyes, the dyes used for a dyeing process are not adhered to fibers but discharged in an amount as high as about 50% thereof, resulting in a dark colored wastewater. For this reason, it is the most severe environmental problem to decolorize reactive anthraquinone dye-containing wastewater in which the residual salt is still present at a high concentration. Therefore, in order to meet stringent environmental regulation, there is an imminent need for more special and cost-efficient technologies as compared to currently available wastewater treatment technologies in the field of textile industries.

Meanwhile, many studies have been conducted about decomposition of toxic and hardly degradable materials through photocatalytic oxidation. As processes for treating dye-containing textile wastewaters through oxidation, Korean Patent Application Publication Nos. 2001-91796, 2003-77865 and 2004-84586, and US Patent Application Publication No. 2005-115004 disclose oxidation processes using fenton reagents, plasma, ozone, or the like. In addition, as processes for treating dye-containing textile wastewater through photocatalytic oxidation, Korean Patent Application Publication No. 2001-8364 and Japanese Patent Application Publication No. 2001-205100 disclose processes using fixed titanium dioxide as a typical photocatalyst, processes for increasing efficiency of dye-containing wastewater treatment as a function of titanium dioxide sizes, or the like.

However, most studies reported heretofore about treatment of reactive anthraquinone dye-containing wastewater have focused on decolorization carried out after diluting highly concentrated wastewater to reduce the salt concentration to a low level. Therefore, such decolorization methods may not be practically applicable due to its low cost efficiency.

SUMMARY

The present disclosure is directed to providing a method and apparatus for decolorization of reactive anthraquinone dye-containing wastewater using photocatalytic oxidation, which include inducing photocatalytic oxidation under a controlled salt concentration and pH of wastewater to perform effective decolorization of reactive anthraquinone dye-containing wastewater.

In one aspect, there is provided a method for decolorization of reactive anthraquinone dye-containing wastewater using photocatalytic oxidation, the method including: introducing a photocatalyst and salt into reactive anthraquinone dye-containing wastewater; and irradiating UV to the photocatalyst to carry out cleavage of the reactive anthraquinone dyes through photocatalytic oxidation, thereby accomplishing decolorization of wastewater.

In the operation of introducing a photocatalyst and salt into reactive anthraquinone dye-containing wastewater, the wastewater may be maintained at a salt concentration of 25-100 g/L, wherein the salt may be at least one selected from a group consisting of NaCl, $Na_2SO_4$, $KNO_3$, $CuSO_4$, $NH_4Cl$, $CH_3COONa$ and combinations thereof. The photocatalyst may be titanium dioxide.

In another aspect, there is provided a method for decolorization of reactive anthraquinone dye-containing wastewater using photocatalytic oxidation, the method including: introducing a photocatalyst into reactive anthraquinone dye-containing wastewater and adjusting pH of the wastewater to a level higher than neutral pH; and irradiating UV to the photocatalyst to carry out cleavage of the reactive anthraquinone dyes through photocatalytic oxidation, thereby accomplishing decolorization of wastewater.

In the operation of introducing a photocatalyst into reactive anthraquinone dye-containing wastewater and adjusting pH of the wastewater, pH of the waste water may be adjusted to pH 10 or higher by using an alkaline material, wherein the alkaline material may be at least one selected from a group consisting of NaOH, $Na_2CO_3$, KOH, $Ca(OH)_2$, $CaCO_3$, $MgCO_3$, $NaHCO_3$ and combinations thereof.

In still another aspect, there is provided a method for decolorization of reactive anthraquinone dye-containing wastewater using photocatalytic oxidation, the method including: introducing a photocatalyst and salt into reactive anthraquinone dye-containing wastewater and adjusting pH of the wastewater to a level higher than neutral pH; and irradiating UV to the photocatalyst to carry out cleavage of the reactive anthraquinone dyes through photocatalytic oxidation, thereby accomplishing decolorization of wastewater.

In the operation of introducing a photocatalyst and salt into reactive anthraquinone dye-containing wastewater and adjusting pH of the wastewater to a level higher than neutral pH, the wastewater may be maintained at a salt concentration of 25-100 g/L.

In yet another aspect, there is provided an apparatus for decolorization of reactive anthraquinone dye-containing wastewater using photocatalytic oxidation, the apparatus including: a photocatalytic oxidation unit providing a space in which reactive anthraquinone dye-containing wastewater and a photocatalyst are received to perform photocatalytic oxidation of reactive anthraquinone dyes; a UV lamp irradiating UV to the photocatalyst; a salt supplying unit from which a salt is introduced to the photocatalytic oxidation unit to control the salt concentration of the wastewater; and an alkaline material supplying unit from which an alkaline material is introduced to the photocatalytic oxidation unit to adjust pH of the wastewater.

By introducing a salt from the salt supplying unit to the photocatalytic oxidation unit, the salt concentration of wastewater may be maintained at 25-100 g/L. The wastewater may be maintained at pH 10 or higher by introducing an alkaline material from the alkaline material supplying unit to the photocatalytic oxidation unit. In addition, the wastewater may be maintained at a salt concentration of 25-100 g/L and pH 10 or higher by introducing a salt and an alkaline material from the salt supplying unit and the alkaline material supplying unit, respectively, to the photocatalytic oxidation unit.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 1 shows views illustrating a change in color of reactive anthraquinone dye-containing wastewater, before photocatalytic oxidation (A) and after photocatalytic oxidation (B), in a test carried out at a high salt concentration of 100 g NaCl/L under pH 12.

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The method disclosed herein is intended for decolorization of reactive anthraquinone dye-containing wastewater. To accomplish this, a photocatalyst is introduced to reactive anthraquinone dye-containing wastewater and UV irradiation is performed to induce photocatalytic oxidation, resulting in cleavage of reactive anthraquinone dyes. In addition, to increase efficiency of cleavage of reactive anthraquinone dyes, photocatalytic oxidation is induced while the reactive anthraquinone dye-containing wastewater is adjusted to have a high salt concentration or a pH higher than neutral pH. Adjustment of salt concentration and that of pH may be applied separately or simultaneously.

First, mechanisms of cleavage of reactive anthraquinone dyes through photocatalytic oxidation will be explained. When a photocatalyst is introduced into reactive anthraquinone dye-containing wastewater and then UV is irradiated thereto, photocatalytic oxidation occurs so that reactive anthraquinone dyes are cleaved into anthraquinone nuclei and functional groups. As the photocatalyst, titanium dioxide ($TiO_2$) may be used.

In addition, as mentioned above, the salt concentration and/or pH of the wastewater may be controlled to accelerate photocatalytic oxidation. Such a high concentration of salt in the wastewater is intended to increase the ionic strength of the wastewater so that the anthraquinone dyes contained in the wastewater and the photocatalyst may have a higher chance of contacting with each other, thereby accelerating photocatalytic oxidation of the reactive anthraquinone dyes. Particular examples of the salt used to increase the salt concentration of the wastewater include at least one selected from a group consisting of NaCl, $Na_2SO_4$, $KNO_3$, $CuSO_4$, $NH_4Cl$, $CH_3COONa$ and combinations thereof.

Meanwhile, pH of the wastewater may be adjusted to a level higher than neutral pH in order to minimize hydrophobic conversion of reactive anthraquinone dyes in the wastewater and to prevent aggregation thereof. In this manner, the reactive anthraquinone dyes and the photocatalyst may have a higher chance of contacting with each other, thereby accelerating photocatalytic oxidation of reactive anthraquinone dyes. As the pH of the wastewater increases above neutral pH, photocatalytic oxidation is more improved. Particular examples of alkaline materials used for the pH adjustment include at least one selected from a group consisting of NaOH, Na$_2$CO$_3$, KOH, Ca(OH)$_2$, CaCO$_3$, MgCO$_3$, NaHCO$_3$ and combinations thereof.

EXAMPLES

The examples (and experiments) will now be described. The following examples (and experiments) are for illustrative purposes only and not intended to limit the scope of the present disclosure.

Example 1 shows a test for photocatalytic oxidation under a high concentration of salt in reactive anthraquinone dye-containing wastewater, Example 2 shows a test for photocatalytic oxidation under a high pH of reactive anthraquinone dye-containing wastewater, and Example 3 shows a test for photocatalytic oxidation under a high concentration of salt and high pH in reactive anthraquinone dye-containing wastewater.

Example 1

Decolorization of Reactive Anthraquinone Dye-Containing Wastewater Through Photocatalytic Oxidation Under Different Salt Concentrations A wastewater sample containing 150 mg/L of a reactive anthraquinone dye, Reactive Blue 4 (RB4) is introduced to a photocatalytic oxidation unit (500 mL) together with a photocatalyst. Then, the wastewater sample and the photocatalyst are agitated at a temperature of 25° C. in order to mix them completely. The photocatalyst used herein is titanium dioxide (TiO$_2$) and is maintained at a concentration of 1 g/L. After that, UV is irradiated to the photocatalytic oxidation unit by using a UV-C lamp maintained at a power of 36 W.

Particularly, UV irradiation is carried out under a salt concentration of 0, 25, 50 and 100 g/L in the wastewater sample to investigate photocatalytic oxidation degrees, i.e., decolorization efficiencies as a function of salt concentrations. The salt concentration is controlled by using NaCl and each wastewater sample having a different salt concentration is irradiated with UV for 1 hour. In addition, the wastewater is maintained at a pH of 7. For reference, the salt may be introduced through a salt supplying unit.

The decolorization efficiency of each wastewater sample having a different salt concentration is calculated by measuring the initial RB4 concentration and the residual RB4 concentration after photocatalytic oxidation to obtain RB4 removed by photocatalytic oxidation. Herein, measurement of RB4 concentration is carried out by using a spectrophotometer at a wavelength of 596 nm, where RB4 dye has the maximum absorbance.

Table 1 shows decolorization efficiencies in reactive anthraquinone dye-containing wastewater through photocatalytic oxidation under different salt concentrations.

TABLE 1

| Salt concentration in wastewater sample (g NaCl/L) | Decolorization efficiency (%) |
| --- | --- |
| 0 | 40.5 |
| 25 | 54.7 |
| 50 | 57.6 |
| 100 | 71.6 |

It can be seen from Table 1 that when introducing a salt into a wastewater sample (25, 50, 100 g NaCl/L), decolorization efficiency in reactive anthraquinone dye-containing wastewater through photocatalytic oxidation is higher than decolorization efficiency in the same sample without an amendment of salt. Particularly, decolorization efficiency increases in proportion to salt concentration. More particularly, a salt concentration of 25 g/L causes an increase in decolorization efficiency of about 14% as compared to the sample using no salt. When introducing 100 g/L of a salt, decolorization efficiency increases by about 31% as compared to the sample without an amendment of salt. This demonstrates that presence of a high concentration of salt in wastewater improves decolorization efficiency through photocatalytic oxidation. It is thought that such a high concentration of salt maintained in wastewater increases the ionic strength of wastewater, so that the reactive anthraquinone dye and the photocatalyst have a higher chance of contacting with each other. As a result, it is possible to obtain improved decolorization efficiency through photocatalytic oxidation.

Example 2

Decolorization of Reactive Anthraquinone Dye-Containing Wastewater Through Oxidation Under Different pH Conditions A test is carried out under the same conditions as described in Example 1, except that no salt is introduced to the wastewater sample, and 1N HCl and NaOH are used to adjust pH of the wastewater sample to 4, 7, 10 and 12. In this manner, decolorization efficiencies in reactive anthraquinone dye-containing wastewater are investigated as a function of pH conditions. Each sample is subjected to reaction for 2 hours. For reference, introduction of alkaline materials for the adjustment of pH may be carried out through an alkaline material supplying unit.

Table 2 shows decolorization efficiencies in reactive anthraquinone dye-containing wastewater through photocatalytic oxidation under different pH conditions. In the same manner as Example 1, the decolorization efficiency of each wastewater sample under a different pH condition is calculated by measuring the initial RB4 concentration and the residual RB4 concentration after photocatalytic oxidation by using a spectrophotometer to obtain RB4 removed by photocatalytic oxidation.

TABLE 2

| pH | Decolorization efficiency (%) |
| --- | --- |
| 4 | 49.6 |
| 7 | 63.2 |
| 10 | 68.5 |
| 12 | 89.8 |

As can be seen from Table 2, when the reactive anthraquinone dye-containing wastewater is maintained at pH 4, the lowest decolorization efficiency is provided. It is believed that since titanium dioxide is positively charged under acidic conditions, negatively charged reactive anthraquinone dye is adsorbed to titanium dioxide at the initial time of reaction, resulting in degradation of activity of photocatalyst, titanium dioxide. On the other hand, when pH is 10 or 12, decolorization efficiency is increased by 19% and 40%, respectively. It is thought that reactive anthraquinone dye has higher hydrophilicity under a high pH condition, and thus aggregation of the dye itself prevents degradation of photocatalytic oxidation.

Example 3

Decolorization of Reactive Anthraquinone Dye-Containing Wastewater Through Photocatalytic Oxidation Under High Salt Concentration/Different pH Conditions A test is carried out under the same conditions as described in Examples 1 and 2, except that a salt is introduced into the wastewater sample while adjusting pH of the wastewater sample to a different level. Particularly, 100 g/L of NaCl is introduced into each wastewater sample and each wastewater sample is adjusted to a pH of 4, 7, 10 or 12, and then decolorization efficiency is determined at a high salt concentration under a different pH condition. Each wastewater sample is subjected to reaction for 2 hours.

Table 3 shows decolorization efficiencies in reactive anthraquinone dye-containing wastewater through photocatalytic oxidation in the presence of a high concentration of salt (100 g NaCl/L) under different pH conditions. In the same manner as Examples 1 and 2, the decolorization efficiency of each wastewater sample is calculated by measuring the initial RB4 concentration and the residual RB4 concentration after photocatalytic oxidation by using a spectrophotometer to obtain RB4 removed by photocatalytic oxidation.

TABLE 3

| Salt concentration of wastewater sample (g NaCl/L) | pH | Decolorization efficiency (%) |
|---|---|---|
| 100 | 4 | 71.9 |
| 100 | 7 | 71.4 |
| 100 | 10 | 78.7 |
| 100 | 12 | 96.8 |

As can be seen from Table 3, when the reactive anthraquinone dye-containing wastewater is maintained at a pH of 4 and 7 in the presence of a high concentration of salt, decolorization efficiencies through photocatalytic oxidation are 71.9% and 71.4%, respectively. Such results are similar to the decolorization efficiency (71.6%) of Example 1, wherein the wastewater sample is maintained at a salt concentration of 100 g/L under pH 7. However, when the reactive anthraquinone dye-containing wastewater is maintained at a pH of 10 and 12 in the presence of a high concentration of salt, decolorization efficiencies through photocatalytic oxidation are 78.7% and 96.8%, respectively. Those efficiencies are higher than the efficiencies of Example 2 (no salt introduction, the wastewater is maintained at a pH of 10 and 12) by 10.2% and 7.0%, respectively. For reference, FIG. 1 shows photographic views illustrating a change in color of reactive anthraquinone dye-containing wastewater, before photocatalytic oxidation (A) and after photocatalytic oxidation (B), in a test carried out at a high salt concentration of 100 g NaCl/L under pH 12. As shown in FIG. 1, the wastewater is substantially decolorized after the photocatalytic oxidation.

Therefore, when decolorizing reactive anthraquinone dye-containing wastewater in the presence of a high concentration of salt while maintaining the pH of wastewater at 10 or higher, it is possible to maximize the photocatalytic oxidation, thereby providing maximized decolorization efficiency. It is thought that this results from the fact that the presence of a high concentration of salt in wastewater increases the ionic strength of wastewater and the contact between a dye and a photocatalyst, and that a high pH condition makes reactive anthraquinone dyes more hydrophilic to cause dye aggregation, thereby preventing degradation of photocatalytic oxidation.

In conclusion, a high concentration of salt and a high pH of wastewater are effective for maximized decolorization of reactive anthraquinone dye-containing wastewater. In addition, decolorization efficiency increases in proportion to salt concentration and pH of wastewater.

The method and apparatus for decolorization of reactive anthraquinone dye-containing wastewater using photocatalytic oxidation provide the effects as described hereinafter.

It is possible to carry out decolorization of reactive anthraquinone dye-containing wastewater generated after a dyeing process with high efficiency through photocatalytic oxidation. Particularly, it is possible to carry out highly efficient decolorization in a stable manner through photocatalytic oxidation in the presence of a high concentration of salt, thereby avoiding a need for dilution of wastewater.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method for decolorization of reactive anthraquinone dye-containing wastewater using photocatalytic oxidation, comprising:
    introducing a photocatalyst and salt into reactive anthraquinone dye-containing wastewater wherein the salt is at least one selected from a group consisting of NaCl, Na2SO4, KNO3, CuSO4, NH4Cl, CH3COONa and combinations thereof, and the wastewater is maintained at a salt concentration of 50-100 g/L; and
    irradiating UV to the photocatalyst to carry out cleavage of the reactive anthraquinone dyes through photocatalytic oxidation, thereby accomplishing decolorization of wastewater.

2. The method for decolorization of reactive anthraquinone dye-containing wastewater using photo catalytic oxidation according to claim 1, wherein the photocatalyst is titanium dioxide.

3. A method for decolorization of reactive anthraquinone dye-containing wastewater using photo catalytic oxidation, comprising:
    introducing a photocatalyst into reactive anthraquinone dye-containing wastewater and adjusting pH to 12 or higher, wherein the wastewater is maintained at a salt concentration of 50-100 g/L by using the salt which increases a salt concentration; and
    irradiating UV to the photocatalyst to carry out cleavage of the reactive anthraquinone dyes through photocatalytic oxidation, thereby accomplishing decolorization of wastewater.

4. The method for decolorization of reactive anthraquinone dye-containing wastewater using photocatalytic oxidation according to claim 3, wherein pH of the wastewater is adjusted by using an alkaline material, and the alkaline material is at least one selected from a group consisting of NaOH, Na2CO3, KOH, Ca(OH)2, CaCO3, MgCO3, NaHCO3 and combinations thereof.

5. A method for decolorization of reactive anthraquinone dye-containing wastewater using photocatalytic oxidation, comprising:
  introducing a photocatalyst and salt into reactive anthraquinone dye-containing wastewater and adjusting pH to 12 or higher, wherein the salt is at least one selected from a group consisting of NaCl, Na2SO4, KNO3, CuSO4, NH4Cl, CH3COONa and combinations thereof, and the wastewater is maintained at a salt concentration of 50-100 g/L; and
  irradiating UV to the photocatalyst to carry out cleavage of the reactive anthraquinone dyes through photocatalytic oxidation, thereby accomplishing decolorization of wastewater.

6. The method for decolorization of reactive anthraquinone dye-containing wastewater using photocatalytic oxidation according to claim 5, wherein pH of the wastewater is adjusted by using an alkaline material, and the alkaline material is at least one selected from a group consisting of NaOH, Na2CO3, KOH, Ca(OH)2, CaCO3, MgCO3, NaHCO3 and combinations thereof.

* * * * *